Sept. 29, 1936.　　　　G. F. MYERS　　　　2,055,502
VEHICLE
Original Filed Sept. 6, 1930
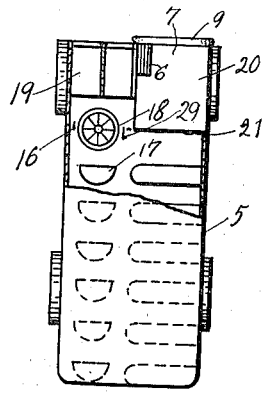
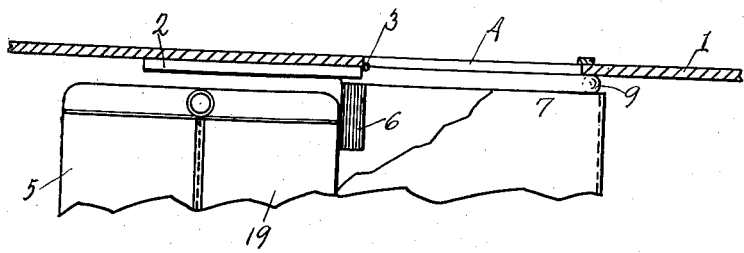
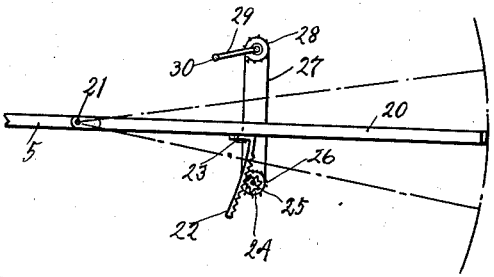
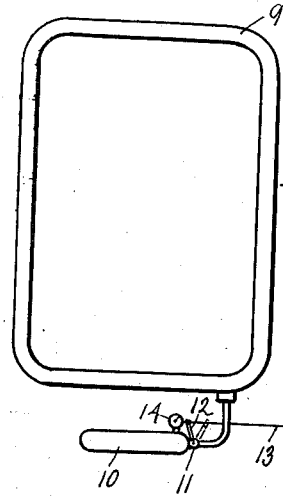
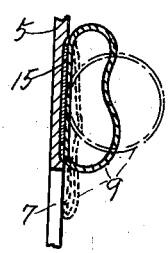
INVENTOR.
George Francis Myers Patented Sept. 29, 1936

2,055,502

UNITED STATES PATENT OFFICE 2,055,502

VEHICLE

George Francis Myers, New York, N. Y.

Application September 6, 1930, Serial No. 480,088
Renewed December 8, 1934

19 Claims. (Cl. 180—89)

This invention relates to vehicles.

It has for its object to produce a coach that the door thereof when registering with another and extraneous door will keep out all rain and wind, sleet and snow, extreme heat and cold, dust and water, or the like.

Another object is to have the platform, or a part thereof, of the coach so designed that it can be elevated or depressed to conform quickly to the height of the threshold of the said second mentioned door.

The invention also consists in certain other features of construction and in the combination and arrangement of the several parts to be hereinafter described, illustrated in the accompanying drawing, and then specifically pointed out in the claims.

Figure 1 illustrates in plan view the preferred embodiment of the invention, showing the general arrangement thereof; the top of the coach being broken away to show the pivoted platform and the extra levers.

Fig. 2 is a fragmentary plan view, enlarged, of the door of the coach pressed closely against and over another door; here also the top of the coach is broken away.

Fig. 3 is a front view of the doorway of the coach showing the cushion tire and its inflating apparatus.

Fig. 4 is a further enlarged cross section of the cushion tire, showing it in its flaccid or inoperative position in short dotted lines, in its fully expanded position in long dotted lines, and in any particular position it might take when pressed up against the side of another door and surrounding the same, in full lines.

Fig. 5 is a side elevation of the pivoted platform, and the means for elevating and depressing the same.

Similar numerals of reference denote similar parts throughout the several views.

The invention is constructed and operated substantially and preferably as follows: 1 is a housing, 2 its door, 3 the hinge therefor, 4 its doorway, 5 the bus or coach, and 6 its door with 7 its doorway.

Around the doorway is the cushion tire 9 which is expanded by the compressed air in the tank 10, with valve 11, lever 12, push rod 13 and gage 14. This tire is vulcanized or otherwise fastened to a strip 15 along the center line of the tire. The rod 13 connects to and is operated by the lever 16 mounted adjacent to the motorman's seat 17 located behind the steering wheel 18 and motor 19.

The pivoted platform 20 is hinged as at 21 and has a toothed segment 22 fastened thereto as at 23. This segment meshes with the pinion 24, and on the shaft 25 is keyed the sprocket wheel or sheave 26 connected by chain or belt 27 to the wheel 28 and rotated by the crank 29 and handle 30.

There is now absolutely no chance of rain or the like getting between the two doors, and the passengers can now step through the two doors without regarding the weather in any particular. Should it happen that the platform or threshold of the other door was higher or lower than that of the coach, the platform of the latter could easily be changed in height by the motorman turning the crank or lever 29 mounted adjacent to his seat which will lift or depress the platform as desired.

As my invention is in some of its aspects generic, I do not limit myself to the exact details as shown and described, but am entitled to the employment of such equivalents as fairly fall within the scope of the claims.

Therefore it will be understood that various changes may be made in the form, proportion, size and detail of the several structures shown and described, the number and position of certain elements used, as well as the character of the motive power employed, without departing from the spirit of the invention.

I claim:

1. In combination with a coach, a motor mounted adjacent to the forward portion of the coach for driving the same, a door therein mounted in the front face of the coach substantially contiguous to the motor and to one side thereof, a fixed floor in the said coach, and means for raising and lowering a portion only of the said floor adjacent to the said door and the said fixed floor and the said motor.

2. In combination with a coach, of a motor assembly mounted to one side of the coach, a forwardly opening entrance mounted transversely thereto and in part projecting forwardly beyond the said assembly, and a shock absorbing device mounted entirely around the said entrance.

3. In combination with a coach, of a motor assembly, an operator's seat, and controls mounted to one side of the coach, a forwardly opening entrance mounted transversely thereto, part of the said entrance projecting forwardly of the said motor assembly, and a resilient tube mounted on the said forwardly projecting portion and around the said entrance.

4. In combination with a coach, of a motor assembly mounted to one side of the coach, a forwardly opening entrance mounted transversely thereto and in part projecting forwardly beyond the said assembly, and a shock absorbing device mounted entirely around the said entrance.

5. In combination with a coach having a doorway, of inflatable tubing surrounding the same, and means exterior to the tubing and the doorway and originally independent thereof for permanently fastening the tubing to the doorway.

6. In combination with a coach having a doorway, of inflatable tubing surrounding the same, and means comprising a resilient member exterior to the tubing and the doorway and originally independent thereof for mounting the tubing thereon.

7. In combination with a coach having a doorway, of inflatable tubing completely surrounding the same, and means exterior to the tubing and the doorway and originally independent thereof for permanently fastening the tubing to the doorway.

8. In combination with a coach having a doorway, of inflatable tubing surrounding the same, means comprising a flat strip of rubber exterior to the tubing and the doorway and originally independent thereof for fixedly mounting the tubing thereon resiliently.

9. In combination with a coach having a doorway, of an inflatable tube surrounding the same, and flat piece of rubber permanently fastened to the said tube, and mountable around the said doorway.

10. In combination with a coach having a doorway, of an inflatable tube completely surrounding the said doorway, and a flat piece of rubber permanently fastened to the said tube, and mountable around the said doorway.

11. In combination with a coach having a doorway, of an inflatable tube surrounding the same, and a flat piece of rubber permanently fastened to the said tube and removably fastened to the said doorway.

12. In combination with a coach having a doorway, of an inflatable tube surrounding the same, and a flat piece of rubber permanently fastened to the said tube, and mountable around the doorway directly against the same, the said tube projecting outwardly therefrom.

13. In combination with a coach having a doorway, of an inflatable tube surrounding the same, and a flat piece of rubber permanently fastened on each side of the said tube, and mountable around the said doorway.

14. In combination with a coach, of a motor, a door in the front face of the coach adjacent to the motor, and inflatable tubing mounted around the door and projecting therebeyond.

15. In combination with a coach, of a motor, a door in the front face of the coach adjacent to the motor, and inflatable tubing mounted wholly around the door and projecting therebeyond.

16. In combination with a coach, of a motor, a door in the front face of the coach adjacent to the motor, and inflatable tubing mounted around the door and projecting wholly therebeyond.

17. In combination with a coach, of a motor assembly mounted adjacent to the front portion of the coach for driving the same, a door in the front face of the coach mounted ahead of the front portion of the motor assembly, and resilient tubing with circular corners mounted around the door.

18. In combination with a movable structure having a doorway, inflatable tubing surrounding the doorway, and means exterior to the tubing and the doorway and originally independent thereof for permanently fastening the tubing to the doorway.

19. In combination with a doorway, inflatable tubing surrounding the doorway and projecting beyond the same, and means exterior to the tubing and the doorway and originally independent thereof for permanently fastening the tubing to the doorway.

GEORGE FRANCIS MYERS.